United States Patent
Ishikawa et al.

(10) Patent No.: US 6,597,849 B2
(45) Date of Patent: Jul. 22, 2003

(54) OPTICAL FIBER AND OPTICAL COMPONENT INCLUDING THE SAME

(75) Inventors: Shinji Ishikawa, Yokohama (JP); Toshikazu Shibata, Yokohama (JP); Ken Hashimoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 161 days.

(21) Appl. No.: 09/940,620

(22) Filed: Aug. 29, 2001

(65) Prior Publication Data

US 2002/0025131 A1 Feb. 28, 2002

(30) Foreign Application Priority Data

Aug. 30, 2000 (JP) ........................................ 2000-261595

(51) Int. Cl.$^7$ ................................................ G02B 6/02
(52) U.S. Cl. ....................... 385/127; 385/142; 385/144; 385/37
(58) Field of Search ................................ 385/123, 126, 385/124, 127, 142, 144, 37, 24; 65/398, 399, 421, 422

(56) References Cited

U.S. PATENT DOCUMENTS

| | | | | |
|---|---|---|---|---|
| 6,128,928 A | * | 10/2000 | Antos et al. | 65/398 |
| 6,519,403 B1 | * | 2/2003 | Hirano et al. | 385/127 |
| 2002/0061175 A1 | * | 5/2002 | Matsuo et al. | 385/123 |
| 2003/0063857 A1 | * | 4/2003 | Sakamoto et al. | 385/37 |

OTHER PUBLICATIONS

"Optical add/drop multiplexer based on UV–written Bragg grating in a fused 100% coupler", Bakhti et al., Electronics Letters, Apr. 24, 1997, vol. 33, No. 9, pp. 803–804.

"Novel Add/Drop Filter for Wavelength–Division–Multiplexing Optical Fiber Systems Using a Bragg Grating Assisted Mismatched Coupler", Dong et al., IEEE Photonics Technology Letters, vol. 8, No. 12, Dec. 1996, pp. 1656–1658.

"An All Fiber Dense–Wavelength–Division Multiplexer/Demultiplexer Using Photimprinted Bragg Gratings", Bilodeau et al, IEEE Photonics Technology Letters, vol. 7, No. 4, Apr. 1995, pp. 388–390.

"Add–Drop Multiplexer Using Optical Fiber Grating Coupler", Satoda et al, Advance Proceedings of the 2000 IEICE Spring Conference, Lecture No. C–3–65.

"Fabrication of Fused Optical Fiber Grating Coupler",Igarashi et al., Advance Proceedings of the 1999 Fall JSAP Conference, Lecture No. 2p–ZF–8.

"Improvement of Fused Optical Fiber Grating Coupler", Advance Proceedings of the 2000 Spring JSAP Conference, Lecture No. 30a–ZG–18.

* cited by examiner

Primary Examiner—Hemang Sanghavi
(74) Attorney, Agent, or Firm—McDermott, Will & Emery

(57) ABSTRACT

The present invention relates to an optical fiber having a sufficient strength, in which not only a core region but also a cladding region contains $GeO_2$, and an optical component including the same. The optical fiber has an outer diameter D; and comprises a core region, a first cladding region surrounding the core region, and a second cladding region surrounding the first cladding region. The core region is a glass region mainly composed of a silica glass material with a $GeO_2$ content of 1 wt % or more. The first cladding region is a glass region, mainly composed of a silica glass material with a $GeO_2$ content of 1 wt % or more, having an outer diameter of 0.80D or more but 0.98D or less. The second cladding region is a glass region mainly composed of a silica glass material with a $GeO_2$ content of less than 0.2 wt %.

8 Claims, 5 Drawing Sheets

OPTICAL FIBER AND OPTICAL COMPONENT INCLUDING THE SAME

BACKGROUND OF THE INVENTION

1. Field of the Invention

The present invention relates to an optical fiber comprising a structure which can yield a favorable characteristic when formed with a grating whose refractive index changes along an advancing direction of light, and an optical component such as an optical fiber coupler constituted by the optical fiber.

2. Related Background Art

An optical fiber coupler is an optical component in which respective predetermined parts (optical coupling portions) of a plurality of optical fibers are optically coupled, and has functions of multiplexing, demultiplexing, and branching out light, for example. For instance, each of Satoda, et al., "Add-Drop Multiplexer Using Optical Fiber Grating Coupler," Advance Proceedings of the 2000 IEICE Spring Conference, Lecture No. C-3-65 (literature 1); Igarashi, et al., "Fabrication of Fused Optical Fiber Grating Coupler," Advance Proceedings of the 1999 Fall JSAP Conference, Lecture No. 2p-ZF-8 (literature 2); and Igarashi, et al., "Improvement of Fused Optical Fiber Grating Coupler," Advance Proceedings of the 2000 Spring JSAP Conference, Lecture No. 30a-ZG-18 (literature 3) discloses an optical component (optical fiber grating coupler) having an optical coupling part formed with a grating whose refractive index changes periodically.

FIG. 1 is a view showing the configuration of an optical fiber grating coupler as an optical component. The optical fiber grating coupler 1 shown in this drawing comprises a first optical fiber 11 and a second optical fiber 12 which are optically coupled to each other at a predetermined part (optical coupling portion) 13. The optical coupling portion 13 is provided with a Bragg grating whose refractive index changes along a signal direction of light. The optical fiber grating coupler 1 is manufactured by the steps of preparing the first and second optical fibers 11, 12 each having a core region doped with $GeO_2$; arranging the first and second optical fibers 11, 12 closely in contact with each other in parallel and fusing their predetermined parts together while extending them, so as to form the optical coupling portion 13; and irradiating the optical coupling portion 13 with ultraviolet light by a phase grating method or two-beam interference method so as to form a grating.

In the optical fiber grating coupler 1, light entering from a first end 11a of the first optical fiber 11 reaches the optical coupling portion 13. Here, if light having a wavelength satisfying the Bragg condition of the grating in the optical coupling portion 13 reaches the optical coupling portion 13, the light is reflected by the optical coupling portion 13, so as to be emitted from a first end 12a of the second optical fiber 12. If light having a wavelength not satisfying the Bragg condition of the optical coupling portion 13 reaches the optical coupling portion 13 from the first end 11a of the first optical fiber 11, then the light having reached the optical coupling portion 13 is transmitted through the optical coupling portion 13, so as to be emitted from a second end 12b of the second optical fiber 12. In this case, the optical fiber grating coupler 1 functions as a demultiplexer by which the light entering from the first end 11a of the first optical fiber 11 is emitted to one of the first end 12a and second end 12b of the second optical fiber 12 depending on its wavelength.

In the optical fiber grating coupler 1, light entering from the first end 11a of the first optical fiber 11 reaches the optical coupling portion 13. Here, if light having a wavelength not satisfying the Bragg condition of the grating provided in the optical coupling portion 13 reaches the optical coupling portion 13, then the light having reached the optical coupling portion 13 is transmitted through the optical coupling portion 13, so as to be emitted from the second end 12b of the second optical fiber 12. On the other hand, light entering from a second end 11b of the first optical fiber 11 also reaches the optical coupling portion 13. Here, if light having a wavelength not satisfying the Bragg condition of the grating provided in the optical coupling portion 13 reaches the optical coupling portion 13, then the light is reflected by the optical coupling portion 13, so as to be emitted from the second end 12b of the second optical fiber 12. In this case, the optical fiber grating coupler 1 functions as a multiplexer by which the light entering from the first end 11a of the first optical fiber 11 (light having a wavelength not satisfying the Bragg condition) and the light entering from the second end 11b of the first optical fiber 11 (light having a wavelength satisfying the Bragg condition) are multiplexed, and thus multiplexed light is emitted from the second end 12b of the second optical fiber 12.

Since the optical fiber grating coupler 1 has the respective functions of the demultiplexer and multiplexer, it also functions as an optical ADM (add-drop multiplexer). An optical component (optical fiber coupler) whose optical coupling portion 13 is not provided with a grating functions as a demultiplexer by which light entering from the first end 11a of the first optical fiber 11 is branched out so that one of thus branched light components is emitted from the second end 11b of the first optical fiber 11 whereas the other of the branched light components is emitted from the second end 12b of the second optical fiber 12.

SUMMARY OF THE INVENTION

The inventors studied the conventional techniques mentioned above and, as a result, have found problems as follows. The grating provided at the optical coupling portion 13 in the optical fiber grating coupler 1 acting as the optical component is required to function so as to reflect light having a wavelength satisfying the Bragg condition at a high reflectivity and transmit light having a wavelength not satisfying the Bragg condition at a high transmissivity. Therefore, as suggested in F. Bakhti, et al., "Optical add/drop multiplexer based on UV-written Bragg grating in a fused 100% coupler," Electronics Letters, Vol. 33, No. 9, pp. 803–804 (1997) (literature 4), and the above-mentioned literatures 2 and 3, for example, adding $GeO_2$ not only to the respective core regions of the first and second optical fibers 11, 12 but also throughout their cladding regions so as to form a grating not only in the core region but also throughout the cladding region in the optical coupling portion 13 has been under consideration.

However, the inventors have found that the following problems occur if $GeO_2$ is contained not only in the core region of each optical fiber but also throughout the cladding region thereof. Namely, strength extremely decreases in an optical fiber in which the whole cladding region including the core region is doped with $GeO_2$. When making the optical fiber grating coupler 1 such as the one mentioned above by using this optical fiber, $GeO_2$ is likely to evaporate and diffuse upon the fusion for forming the optical coupling portion 13, thereby generating bubbles in the optical fibers. As a consequence, there has been a problem that the fusion becomes difficult or the fusing strength weakens.

In order to overcome the above-mentioned problems according to the inventors' findings, it is an object of the present invention to provide an optical fiber having a sufficient strength, in which not only a core region but also a cladding region is doped with $GeO_2$; and an optical component including the same and having excellent optical coupling characteristics, which is easy to manufacture.

The present invention provides an optical fiber, mainly composed of silica glass, having an outer diameter D; the optical fiber comprising, at least, a core region extending along a predetermined axis, a first cladding region disposed at an outer periphery of the core region, and a second cladding region disposed at an outer periphery of the first cladding region. Each of the core region and the first cladding region is doped with 1 wt % or more of $GeO_2$. On the other hand, the $GeO_2$ content in the second cladding region is less than 0.2 wt %. The first cladding region has an outer diameter of 0.80D or more but 0.98D or less.

Since the optical fiber comprises the structure mentioned above, it yields a high strength. Also, since the $GeO_2$-containing region extends over both of the core region and first cladding region, a grating can be formed throughout both of these regions, whereby excellent optical coupling characteristics can be obtained.

The optical fiber according to the present invention may be configured such that the $GeO_2$ content in the first cladding region is 20% to 180% of that in the core region. In this case, the transmission loss occurring on the shorter wavelength side from the reflection wavelength in an area formed with the grating is lowered to a practically unproblematic level.

The optical fiber according to the present invention may be configured such that the first cladding region has a refractive index higher than that of the second cladding region, whereby the first cladding region has a relative refractive index difference of 0.01% or more with reference to the refractive index of the second cladding region. In an optical component such as an optical fiber grating coupler employing the optical fiber in this case, the quantity of light leaking from the optical coupling portion to the outside is suppressed low, and stable optical coupling characteristics are obtained.

In the optical fiber according to the present invention, each of the first and second cladding regions may be doped with additives which lower the refractive index of silica glass, such as F element and $B_2O_3$, for example. In this case, even when differences in $GeO_2$ content alone cannot fully yield differences in refractive index between the core region, first cladding region, and second cladding region, sufficient refractive index differences can be secured (a desirable refractive index profile can be realized) between these regions if the respective F element contents in first and second cladding regions are set appropriately.

The present invention provides an optical component comprising first and second optical fibers each having the same structure as that of the optical fiber mentioned above (the optical fiber according to the present invention), in which the first and second optical fibers are optically coupled to each other at a predetermined part (optical coupling portion). The optical component may be provided with a Bragg grating along an advancing direction of light in the optical coupling portion. The optical component according to the present invention includes an optical coupler having a light-multiplexing/demultiplexing function and an optical fiber grating coupler, for example. Such an optical component attains a higher strength and excellent optical coupling characteristics, since optical fibers comprising the structure mentioned above (included in the optical fiber according to the present invention) are employed therein.

In the case where light having a predetermined wavelength entering from one end of the first optical fiber is transmitted through the optical coupling portion without being reflected thereby, so as to be emitted from one end of the second optical fiber, the optical component according to the present invention has excellent optical coupling characteristics to such an extent that the optical power at the one end of the second optical fiber is maintained at 95% of the optical power at the one end of the first optical fiber or more.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, embodiments of the optical fiber according to the present invention and the optical component including the same will be explained with reference to FIGS. 1, 2A to 2D, and 3 to 7. In the explanation of the drawings, constituents identical to each other will be referred to with numerals identical to each other without repeating their overlapping descriptions.

Figure 1:
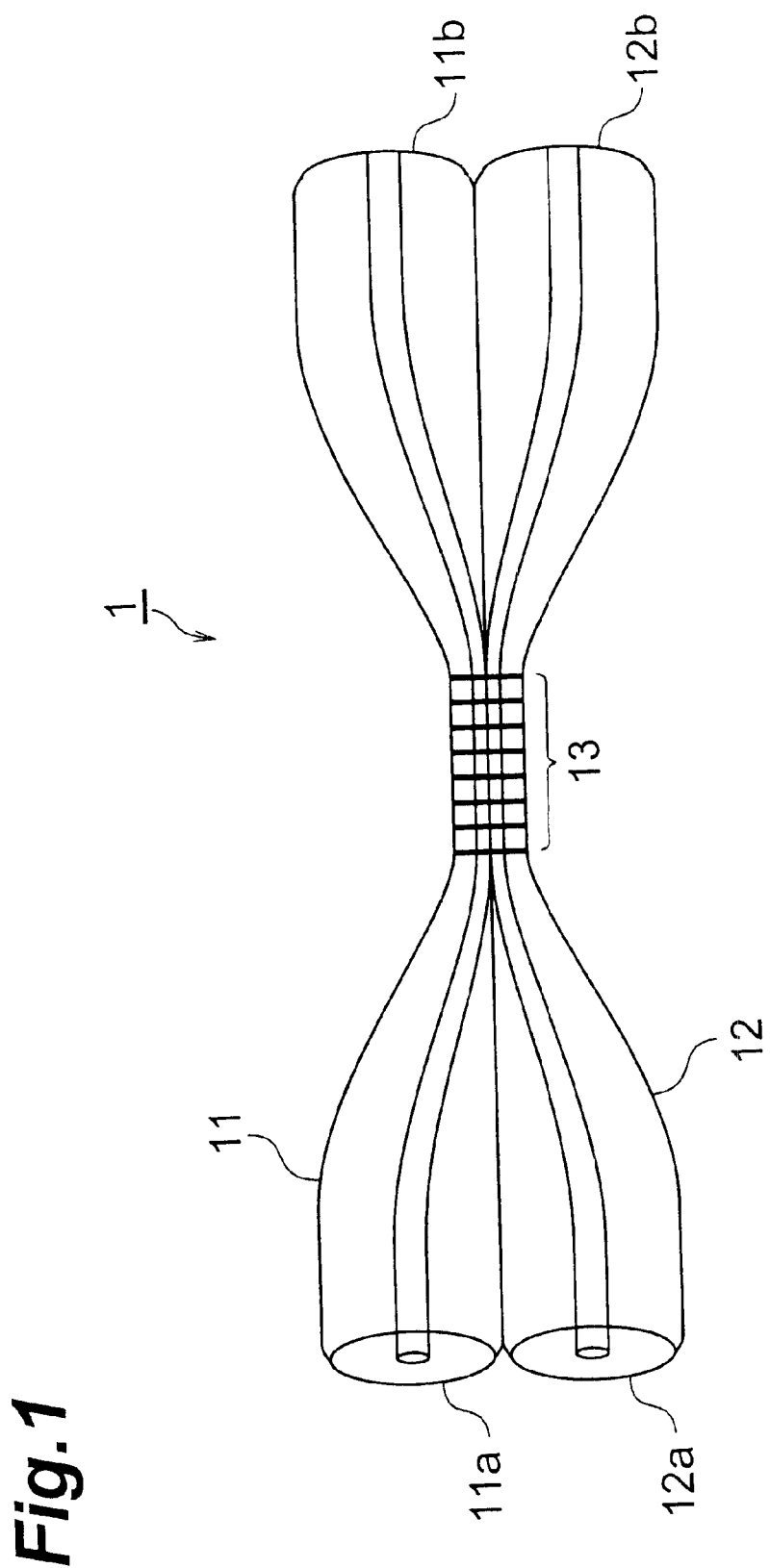
FIG. 1 is a view showing the configuration of an optical fiber grating coupler as an optical component.

FIG. 1 is a view showing the configuration of an optical fiber grating coupler which is an optical component adapted to employ the optical fiber according to the present invention. FIGS. 2A to 2D are views for explaining the structure of the optical fiber according to the present invention, showing a cross-sectional structure of the optical fiber, a refractive index profile thereof, a $GeO_2$ content profile thereof, and an F content profile thereof, respectively.

The optical fiber 100 has an outer diameter D; and comprises a core region 110 extending along a predetermined axis such as an optical axis of the optical fiber 100, a first cladding region 121 surrounding the core region 110, and a second cladding region 122 surrounding the first cladding region 121. The core region 110 has an outer diameter 2a and a refractive index $n_1$. The first cladding region 121 has an outer diameter 2b and a refractive index $n_2$ lower than the refractive index $n_1$. The second cladding region 122 has a refractive index $n_3$ lower than the refractive index $n_2$. In general, the optical fiber 100 has an outer diameter D (=2R, where R is the radius) of 125 μm.

In the optical fiber 100, the outer diameter 2b of the first cladding region 121 (coinciding with the inner diameter of the second cladding region 122) is 0.80D or more but 0.98D or less. On the other hand, the outer diameter 2a of the core region 110 is less than 0.80D (see expression (1)).

$$2a < 0.80D \leq 2b \leq 0.98D \tag{1}$$

Figure 2A:
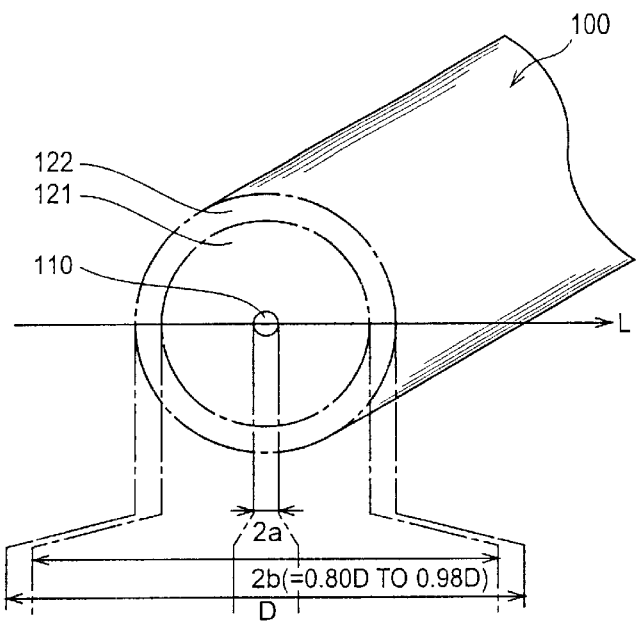
FIGS. 2A to 2D are views for explaining the structure of the optical fiber according to the present invention, showing a cross-sectional structure of the optical fiber, a refractive index profile thereof, a $GeO_2$ content profile thereof, and an F content profile thereof, respectively.
Figure 2B:
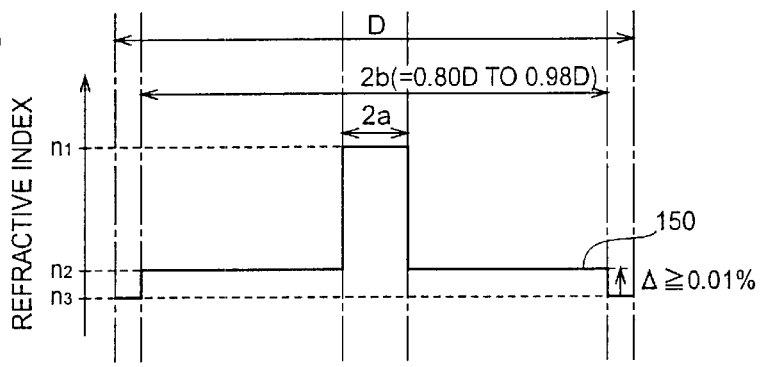
Figure 2C:
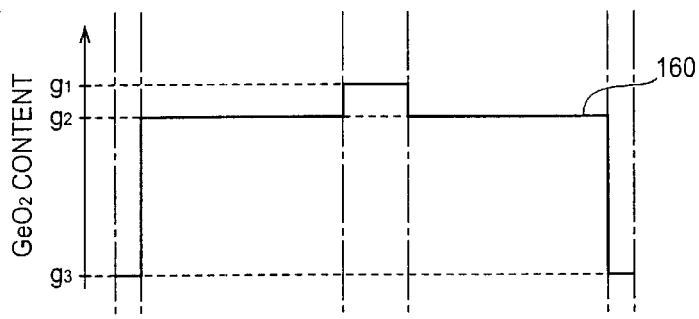
Figure 2D:
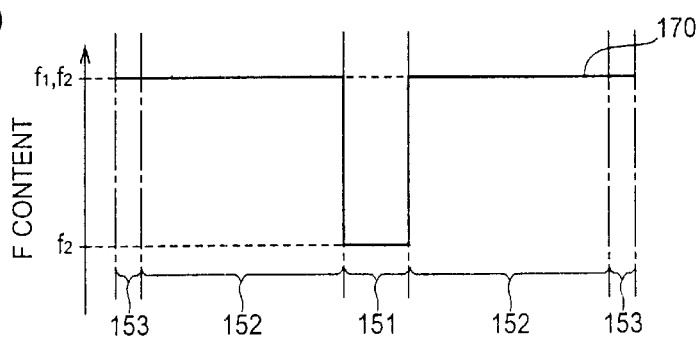

FIG. 2B shows a refractive index profile 150 indicating the refractive index at each part on the line L in FIG. 2A. Areas 151, 152, and 153 in the refractive index profile 150 show refractive indices on the line L of the core region 110, first cladding region 121, and second cladding region 122, respectively.

The optical fiber 100 is mainly composed of a silica glass material. As shown in the $GeO_2$ content profile 160 of FIG. 2C, the $GeO_2$ content $g_1$ in the core region 110 is 1 wt % or more (the $GeO_2$ content on the line L in the core region 110), and the $GeO_2$ content $g_2$ in the first cladding region 121 is also 1 wt % or more (the $GeO_2$ content on the line L in the first cladding region 121). On the other hand, the $GeO_2$ content $g_3$ in the second cladding region 122 is less than 0.2 wt % (the $GeO_2$ content on the line L in the second cladding region 122). (See expressions (2A) to (2C).)

$$g_1 \geq 1 \text{ wt \%} \tag{2A}$$

$$g_2 \geq 1 \text{ wt \%} \tag{2A}$$

$$g_3 < 0.2 \text{ wt \%} \tag{2C}$$

The optical fiber 100 can attain a sufficient strength when provided with the foregoing structure. An optical component such as an optical fiber grating coupler employing the optical fiber 100 (see FIG. 1) can be manufactured easily, and has excellent optical coupling characteristics. A preform for yielding the optical fiber 100 according to the present invention can be manufactured by OVD method, VAD method, and the like.

Preferably, in the optical fiber 100 according to the present invention, the $GeO_2$ content $g_2$ in the first cladding region 121 is 20% to 180% of the $GeO_2$ content $g_1$ in the core region 110 (see expression (3)).

$$0.2g_1 \leq g_2 \leq 1.8g_1 \tag{3}$$

More preferably, the $GeO_2$ content $g_2$ in the first cladding region 121 is 80% to 120% of the $GeO_2$ content $g_1$ in the core region 110 (see expression (4)).

$$0.8g_1 \leq g_2 \leq 1.2g_1 \tag{4}$$

In the optical fiber 100, the respective refractive indices $n_1$, $n_2$, and $n_3$ of the core region 100, first cladding region 121, and second cladding region 122 satisfy the relationship represented by the following expression (5A) Preferably, the relative refractive index difference of the first cladding region 121 with reference to the refractive index $n_3$ of the second cladding region 122 is 0.01% or more (see expression (5B)).

$$n_1 > n_2 > n_3 \tag{5A}$$

$$100 \times [(n_2 - n_3)/n_2] \geq 0.01 \tag{5B}$$

When the foregoing conditions are satisfied, the optical component such as an optical fiber grating coupler employing the optical fiber can fully suppress the quantity of light leaking from the optical coupling portion to the outside, and can attain stable optical coupling characteristics.

More preferably, in the optical fiber 100, each of the first and second cladding regions 121, 122 is doped with an additive which lowers the refractive index of silica glass, such as F element or $B_2O_3$, for example. In this case, even when differences in $GeO_2$ content alone cannot fully yield differences in refractive index between the core region 110, first cladding region 121, and second cladding region 122, sufficient refractive index differences can be secured between the individual glass regions 110, 121, 122 so as to yield a desirable refractive index profile (see FIG. 2B) if the F element content $f_2$ in the first cladding region 121 and the F element content $f_3$ in the second cladding region 122 are set appropriately. The F element content $f_1$ in the core region 110 may be 0 as well.

For example, the optical component employing the optical fiber according to the present invention includes the optical fiber grating coupler 1 shown in FIG. 1. The optical fiber grating coupler 1 comprises a first optical fiber 11 and a second optical fiber 12, each of which is prepared as the optical fiber 100 comprising the structure mentioned above. When the first and second optical fibers 11, 12 are optically coupled at a predetermined part (optical coupling portion 13), an optical fiber coupler is constructed. The optical coupling portion 13 is provided with a Bragg grating along an advancing direction of light. In the making of the optical fiber grating coupler 1, the first optical fiber 11 and second optical fiber 12 are arranged closely in contact with each other in parallel, and thus contacted portions are partly heated so as to be fused together and elongated, thus forming the optical coupling portion 13, which is then irradiated with ultraviolet light (e.g., laser light having a wavelength of 247 nm outputted from a KrF excimer laser source) by a phase grating method or two-beam interference method, whereby a refractive index modulation is formed. Here, it is necessary that the following expression (6), i.e., Bragg condition, be satisfied among the wavelength Λ of the light to be reflected, the effective refractive index n of each optical fiber, and the period Λ of refractive index modulation (grating period):

$$\lambda = 2n\Lambda \tag{6}$$

Figure 3:
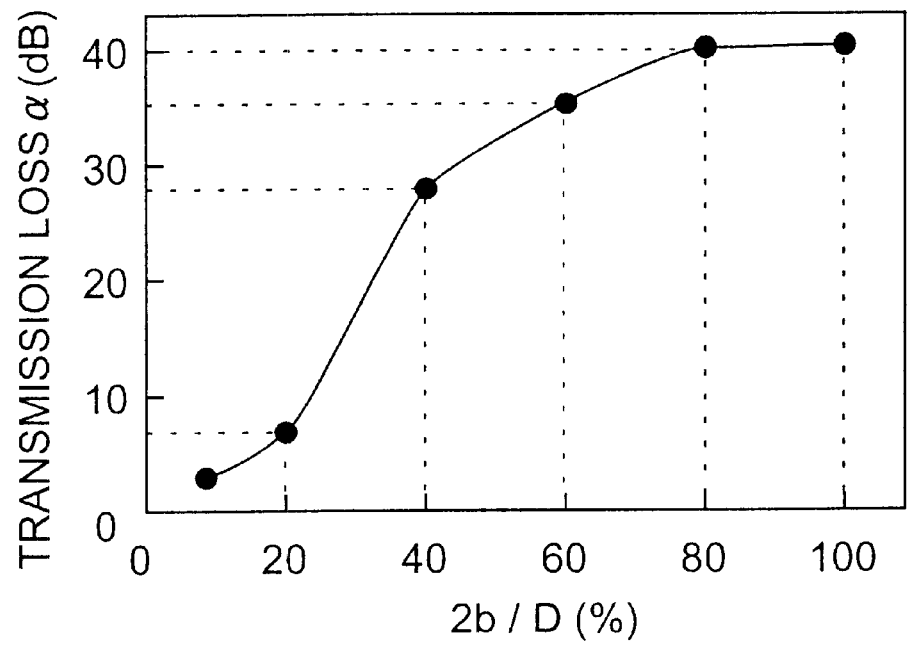
FIG. 3 is a graph showing, as an optical coupling characteristic of an optical component employing the optical fiber according to the present invention, a relationship between the transmission loss α (dB) with respect to light having a wavelength of 1.55 μm and the ratio 2b/D (%)

FIG. 3 is a graph showing, as an optical coupling characteristic of an optical fiber grating coupler which is an optical component employing the optical fiber according to the present invention, a relationship between the transmission loss α (dB) with respect to light having a wavelength of 1.55 μm and the ratio 2b/D (%)

Each of the prepared first and second optical fibers 11, 12 constituting the optical fiber grating coupler 1 (see FIG. 1) is the optical fiber comprising the structure shown in FIGS. 2A to 2D (included in the optical fiber according to the present invention), in which the $GeO_2$ content $g_1$ in the core region 110 is 5 wt %, the $GeO_2$ content $g_2$ in the first cladding region 121 is 4.5 wt %, and the $GeO_2$ content $g_3$ in the second cladding region 122 is 0 wt % (i.e., no $GeO_2$ is contained therein). If the ratio 2b/D is 100%, there will be no second cladding region. When such first and second optical fibers 11, 12 are elongated while in a state where they are partly fused together, and thus fused part (optical coupling portion 13) is formed with a grating having a period adapted to reflect light having a wavelength of 1.55 µm, the optical fiber grating 1 is obtained.

The inventors measured the transmission loss α (dB) concerning thus manufactured optical fiber grating coupler 1 while changing the ratio 2b/D of the outer diameter 2b of the first cladding region 121 to the fiber diameter D (=125 µm) within the range from 16% to 100%. The transmission loss α (dB) is the amount of loss of light having a wavelength of 1.55 µm directed from the first end 11a of the first optical fiber 11 to the second end 12b of the second optical fiber 12 by way of the optical coupling portion 13. As can be seen from FIG. 3, the transmission loss α (dB) sufficiently increases when the outer diameter 2b of the first cladding region 121 is 0.6D or more (=75 µm), and further increases when the outer diameter 2b of the first cladding region 121 is 0.8D or more (=100 µm).

Figure 4:
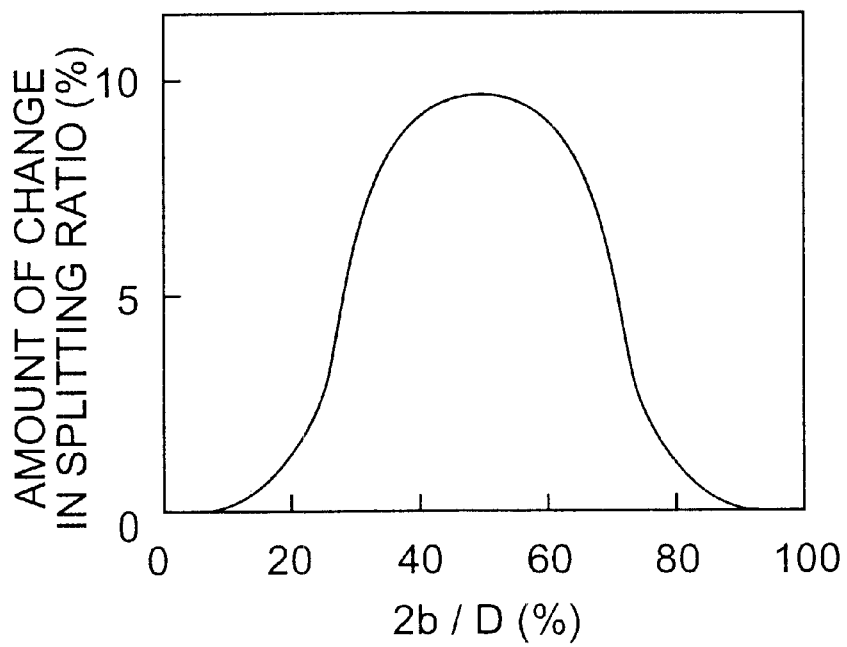
FIG. 4 is a graph showing, as an optical coupling characteristic of an optical component employing the optical fiber according to the present invention, a relationship between the amount of change in splitting ratio (%) and the ratio 2b/D (%)

FIG. 4 is a graph showing, as an optical coupling characteristic of an optical component employing the optical fiber according to the present invention, a relationship between the amount of change in splitting ratio (%) and the ratio 2b/D (%). Here, the optical component prepared for measurement is an optical fiber grating coupler having a structure similar to that of the optical component prepared for the measurement in FIG. 3. Here, the amount of change in splitting ratio is given by the difference between the respective splitting ratios before and after forming the grating, and indicates the degree of contribution of the formed grating to the change in splitting ratio.

First, in the measurement of splitting ratio, a plurality of kinds of optical fiber couplers having respective values of ratio 2b/D within the range from 0% to 100% are prepared. Concerning the light having a wavelength of 1.55 µm entering from the first end 11a of the first optical fiber 11 in each sample before forming the grating, the intensity Pi of light emitted from the second end 11b of the first optical fiber 11 and the intensity $P_2$ of light emitted from the second end 12b of the second optical fiber 12 are measured, and the splitting ratio ($P_2/(P_1+P_2)$) before forming the grating is calculated. For each sample after forming the grating, the splitting ratio ($P_2/(P_1+P_2)$) is also calculated from the respective intensities $P_1$, $P_2$ of light emitted from the ends 11b, 12b. Thus calculated difference between the respective splitting ratios before and after forming the grating is taken as the amount of change in splitting ratio.

As a result, as can be seen from FIG. 4, the change in splitting ratio ($P_2/(P_1+P_2)$) is greater when the ratio 2b/D ranges from about 50% to about 70%, and is smaller when the ratio 2b/D is not greater than about 30% or not smaller than about 80%.

It can be seen from the graphs of FIGS. 3 and 4 that excellent optical coupling characteristics (with a large transmission loss α and a stable splitting ratio ($P_2/(P_1+P_2)$)) can be obtained when the first cladding region 121 whose $GeO_2$ content $g_2$ is 1 wt % or more has an outer diameter 2b of 0.8D or more (=100 µm).

Figure 5:
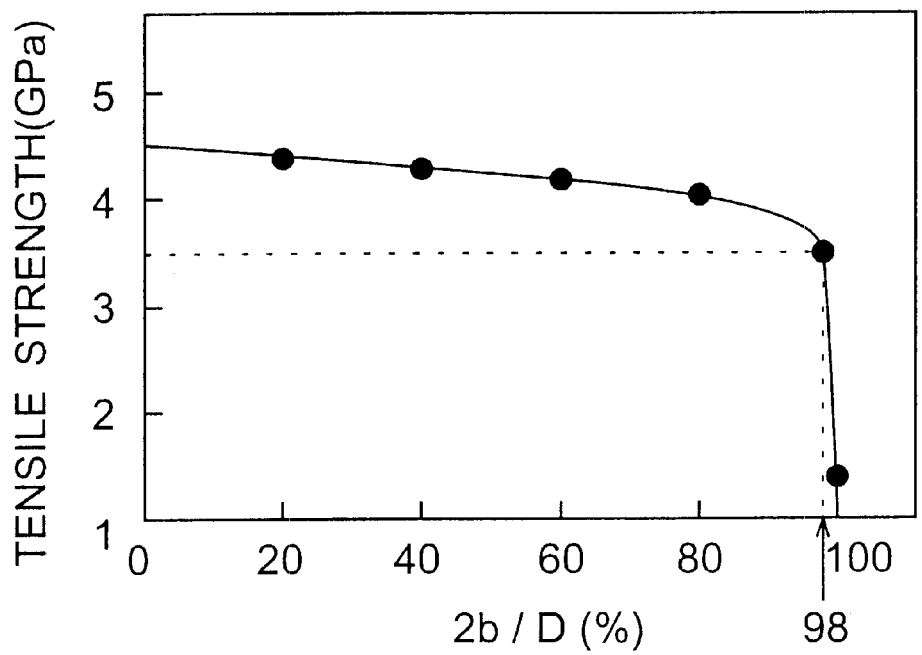
FIG. 5 is a graph showing a strength characteristic of the optical fiber according to the present invention with respect to the ratio 2b/D (%)

FIG. 5 is a graph showing a strength characteristic (tensile strength (GPa)) of the optical fiber according to the present invention with respect to the ratio 2b/D.

The samples (each having a cross-sectional structure similar to that of FIG. 2A) prepared for the measurement of strength characteristic have ratios 2b/D of 20%, 40%, 60%, 80%, 98%, and 100%, respectively. In each sample, the $GeO_2$ content $g_1$ in the core region 110 is 5 wt %, the $GeO_2$ content $g_2$ in the first cladding region 121 is 4.5 wt %, and the $GeO_2$ content $g_3$ in the second cladding region 122 is 0 wt %. Namely, the second cladding region 122 contains no $GeO_2$. Here, no second cladding region exists in the sample whose ratio 2b/D is 100%.

Concerning each of thus prepared samples, the inventors measured the tensile strength (the tension at which each sample broke when pulled by both ends thereof). As can be seen from FIG. 5, a tension of 3.5 Gpa or more is necessary for breaking the fiber when the ratio 2b/D is 98% or less, whereas the tensile strength drastically decreases when the ratio 2b/D exceeds 98%.

Figure 6:
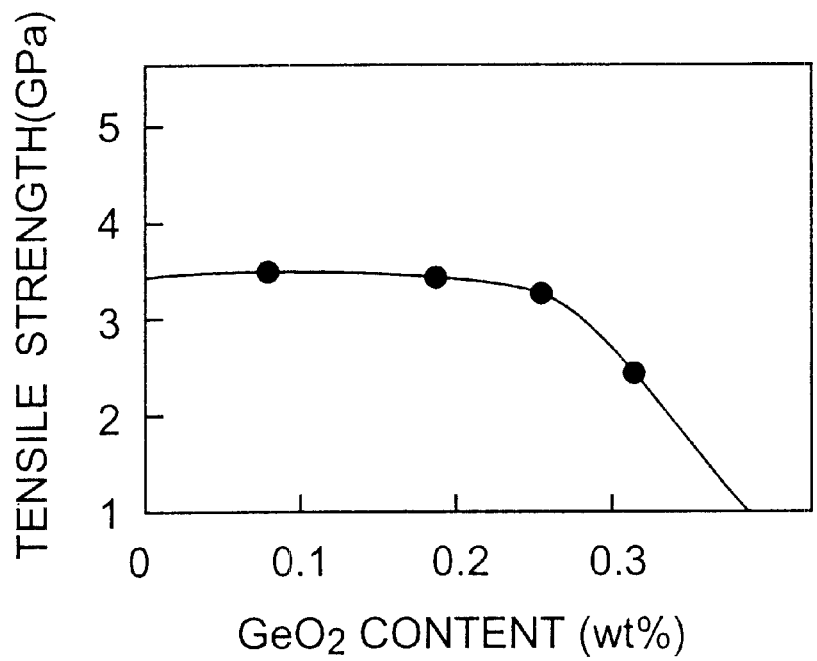
FIG. 6 is a graph showing a strength characteristic of the optical fiber according to the present invention with respect to the $GeO_2$ content.

FIG. 6 is a graph showing a strength characteristic (tensile strength (GPa)) of the optical fiber according to the present invention with respect to the $GeO_2$ content in the second cladding.

In each of the samples (having a cross-sectional structure similar to that of FIG. 2A), the $GeO_2$ content $g_1$ in the core region 110 is 5 wt %, and the $GeO_2$ content $g_2$ in the first cladding region 121 is 4.5 wt %. The $GeO_2$ content $g_3$ in the second cladding region 122 in each sample is set to a given value within the range from 0 wt % to 0.3 wt %. Here, the ratio (2b/D) of the outer diameter 2b of the first cladding region 121 to the fiber diameter D (=125 µm) is fixed at 80%.

For each of thus prepared samples, the inventors measured the tensile strength. As can be seen from FIG. 6, a tension of 3.0 GPa or more is necessary for breakage if the $GeO_2$ content $g_3$ in the second cladding region 122 is 0.25 wt % or less, whereas the tension necessary for breakage is about 3.5 GPa if the $GeO_2$ content $g_3$ in the second cladding region 122 is less than 0.20 wt %. On the other hand, the tension necessary for breakage drastically lowers if the $GeO_2$ content $g_3$ in the second cladding region 122 exceeds 0.25 wt %.

From the results shown in the graphs of FIGS. 5 and 6, it can be seen that an optical fiber having a practically sufficient strength characteristic can be obtained if the first cladding region 121 whose $GeO_2$ content $g_2$ is 1 wt % or more has an outer diameter 2b of 0.98D or less while the $GeO_2$ content $g_3$ in the second cladding region 122 is less than 0.20 wt %.

Figure 7:
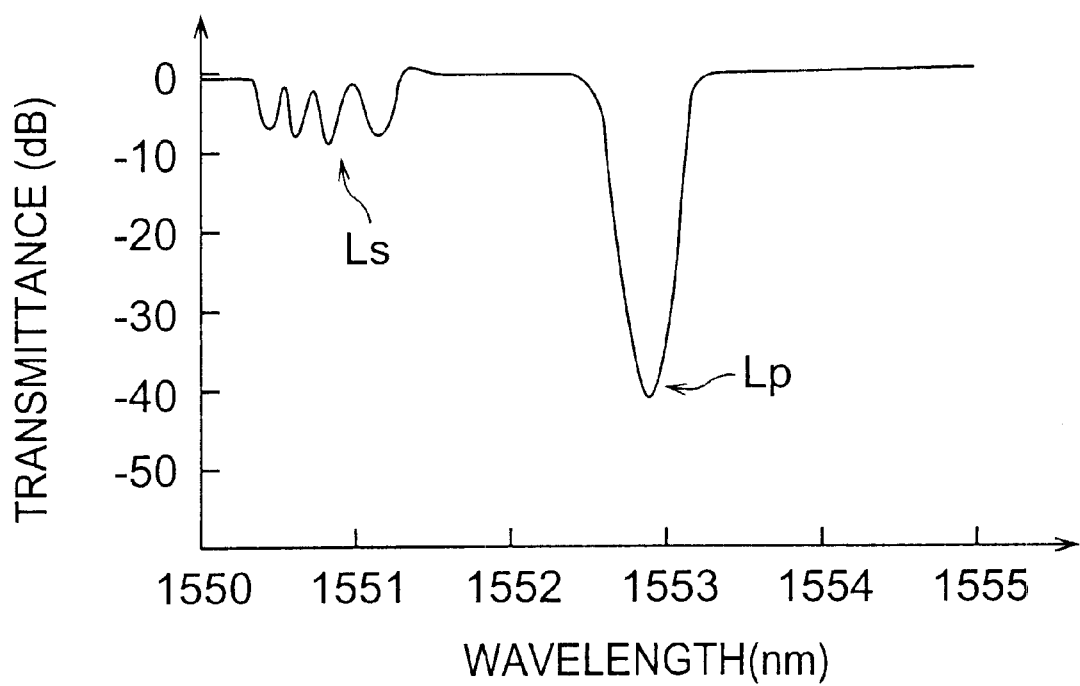
FIG. 7 is a graph showing, as an optical coupling characteristic of an optical component employing the optical fiber according to the present invention, a relationship between the transmittance (dB) and the wavelength (nm).

FIG. 7 is a graph showing an optical characteristic (dependence of transmittance upon wavelength) of the optical fiber grating coupler (see FIG. 1) as an optical component employing the optical fiber according to the present invention. This graph indicates the wavelength dependence of the transmittance of light reaching the second end 12b of the second optical fiber 12 from the first end 11a of the first optical fiber 11. The optical fiber grating coupler prepared for this measurement is provided with a Bragg grating having a reflection wavelength of 1553 nm. Usually, the light having a wavelength of 1553 nm entering from the first end 11a of the first optical fiber 11 is mostly Bragg-reflected by the grating provided in the optical coupling portion 13, so as to be emitted from the first end 12a of the second optical fiber 12. Therefore, the quantity of light (transmittance T) directed from the first end 11a of the first optical fiber 11 to the second end 12b of the second optical fiber 12 is small at a wavelength of 1553 nm.

In general, a transmission loss (short wavelength loss $L_s$) occurs on the shorter wavelength side from the reflection wavelength 1553 nm as shown in FIG. 7. If the relationship between the $GeO_2$ content $g_1$ in the core region 110 and the $GeO_2$ content $g_2$ in the first cladding region 121 satisfies the above-mentioned expression (3), however, then the transmission loss occurring on the shorter wavelength side from the reflection wavelength 1553 nm becomes 0.5 dB or less, which is practically unproblematic. If their relationship satisfies the above-mentioned expression (4), then the transmission loss occurring on the shorter wavelength side from the reflection wavelength 1553 nm becomes 0.2 dB or less, which is more preferable.

Preferably, the optical component 1 according to the present invention (see FIG. 1) is configured such that, concerning the light entering from the first end 11a of the first optical fiber 11 and exiting from the second end 12b of the second optical fiber 12 in the case where the optical coupling portion 13 is provided with no grating, the ratio of power upon exiting is 95% or more of that upon entering. If the optical coupling portion 13 is provided with a grating having a period Λ adapted to reflect light having a wavelength λ, then the optical component 1 can reflect 95% or more of light at the wavelength λ having reached the optical coupling portion 13 from the first end 11a of the first optical fiber 11 toward the first end 12a of the second optical fiber 12.

Without being restricted to the embodiments mentioned above, the present invention can be modified in various ways. For example, the refractive index profile of the optical fiber according to the present invention is not limited to the form shown in FIG. 2B, but can be modified in various manners as long as the gist of the present invention is unchanged. For example, the refractive index of the first cladding region 121 is allowed to change along a diameter direction.

In the present invention, as in the foregoing, the outer diameter of the first cladding region is set to 0.80D or more but 0.98D or less with respect to the fiber outer diameter D, whereas the $GeO_2$ content in each of the core region and first cladding region is set to 1 wt % or more, and the $GeO_2$ content in the second cladding region is set to less than 0.2 wt %. As a consequence of this configuration, the optical fiber can attain a high strength and can form a grating not only in the core region but also in the first cladding region, whereby excellent optical coupling characteristics can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber having an outside diameter D, said optical fiber comprising:

a core region extending along a predetermined axis, said core region having a $GeO_2$ content of 1 wt % or more;

a first cladding region disposed at an outer periphery of said core region, said first cladding region having an outer diameter of 0.80D or more but 0.98D or less and a $GeO_2$ content of 1 wt % or more; and a second cladding region disposed at an outer periphery of said first cladding region, said second cladding region having a $GeO_2$ content of less than 0.2 wt %.

2. An optical fiber according to claim 1, wherein said $GeO_2$ content in said first cladding region is 20% to 180% of that in said core region.

3. An optical fiber according to claim 1, wherein said first cladding region has a refractive index higher than that of said second cladding region, and a relative refractive index difference of 0.01% or more with respect to said second cladding region.

4. An optical fiber according to claim 1, wherein each of said first and second cladding regions is doped with an additive which lowers the refractive index of silica glass.

5. An optical component comprising first and second optical fibers each having a structure identical to that of the optical fiber according to claim 1, said first and second optical fibers being optically coupled to each other by way of an optically coupling portion located at a predetermined part of each of said first and second optical fibers.

6. An optical component according to claim 5, wherein light having a predetermined wavelength successively propagating through one end of said first optical fiber, said optical coupling portion, and one end of said second optical fiber has an optical power at said one end of said second optical fiber which is 95% or more of that at said one end of said first optical fiber.

7. An optical component according to claim 5, wherein said optical coupling portion is provided with a Bragg grating extending along an advancing direction of light.

8. An optical component according to claim 7, wherein light having a predetermined wavelength successively propagating through one end of said first optical fiber, said optical coupling portion, and one end of said second optical fiber has an optical power at said one end of said second optical fiber which is 95% or more of that at said one end of said first optical fiber.

* * * * *